US012381358B2

(12) United States Patent
Su et al.

(10) Patent No.: US 12,381,358 B2
(45) Date of Patent: Aug. 5, 2025

(54) UNIVERSAL SERIAL BUS DEVICE

(71) Applicant: DARFON ELECTRONICS CORP., Taoyuan (TW)

(72) Inventors: Cheng-Min Su, Taoyuan (TW); Chien-Chang Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 345 days.

(21) Appl. No.: 18/197,710

(22) Filed: May 15, 2023

(65) Prior Publication Data

US 2023/0402796 A1 Dec. 14, 2023

Related U.S. Application Data

(60) Provisional application No. 63/342,634, filed on May 17, 2022.

(30) Foreign Application Priority Data

May 5, 2023 (TW) ................................ 112116758

(51) Int. Cl.
*H01R 13/648* (2006.01)
*H01R 13/70* (2006.01)
(Continued)

(52) U.S. Cl.
CPC ....... *H01R 13/6485* (2013.01); *H01R 13/701* (2013.01); *H01R 13/7175* (2013.01); *H01R 24/60* (2013.01); *H01R 2107/00* (2013.01)

(58) Field of Classification Search
CPC .............. H01R 13/6485; H01R 13/701; H01R 13/7175; H01R 24/60; H01R 2107/00
(Continued)

(56) References Cited

U.S. PATENT DOCUMENTS 4,809,126 A * 2/1989 Burkman ............ H01H 13/702 361/220
9,722,364 B1 * 8/2017 Chueh .................... H02H 9/041
(Continued)

FOREIGN PATENT DOCUMENTS

CN 201115124 Y 9/2008
CN 106025679 A 10/2016
(Continued)

*Primary Examiner* — Gary F Paumen
(74) *Attorney, Agent, or Firm* — Winston Hsu

(57) ABSTRACT

A USB device includes a base, a circuit board disposed on the base and having front-end and rear-end portions and a ground circuitry, an upper cover, solder points, a switch and a button mount. The rear-end portion is used for inserting into a connection port of a computer terminal. The upper cover covers the front-end portion and has an opening. The solder points are formed on the front-end portion and coupled to the ground circuitry. The switch having a metal cover is soldered to the solder points for controlling wireless connection between the computer terminal and an external device. The button mount is movably disposed through the opening and sleeves the front-end portion for triggering the switch. An electrostatic discharge entering from the opening can pass through a first guide hole of the button mount and is conducted to the ground circuitry via the metal cover and the solder point.

12 Claims, 6 Drawing Sheets

(51) Int. Cl.
*H01R 13/717* (2006.01)
*H01R 24/60* (2011.01)
*H01R 107/00* (2006.01)

(58) Field of Classification Search
USPC .................................................. 439/488, 181
See application file for complete search history.

(56) References Cited

U.S. PATENT DOCUMENTS

| | | | | |
|---|---|---|---|---|
| 2007/0046550 | A1* | 3/2007 | Park ......................... | H01Q 1/36 343/702 |
| 2011/0028191 | A1* | 2/2011 | Huang ..................... | H04R 1/08 455/575.7 |
| 2017/0054289 | A1* | 2/2017 | Kuo ....................... | H02H 9/046 |

FOREIGN PATENT DOCUMENTS

| | | | | | |
|---|---|---|---|---|---|
| CN | 211022661 U | * | 7/2020 | ........... | A61B 5/0432 |
| CN | 111435768 B | | 3/2022 | | |
| CN | 110518394 B | * | 5/2022 | ......... | H01R 12/7088 |
| JP | 2000223853 A | * | 8/2000 | ............... | H05K 5/03 |
| TW | I540418 B | | 7/2016 | | |
| TW | I727262 B | | 5/2021 | | |

* cited by examiner

UNIVERSAL SERIAL BUS DEVICE

CROSS REFERENCE TO RELATED APPLICATIONS

This application claims the benefit of U.S. Provisional Application No. 63/342,634, filed on May 17, 2022. The content of the application is incorporated herein by reference.

BACKGROUND OF THE INVENTION

1. Field of the Invention

The present invention relates to a universal serial bus device, and more specifically, to a universal serial bus device having an anti-electrostatic discharge function.

2. Description of the Prior Art

Nowadays, instead of a wired connection manner, many electronic products are developed in a wireless connection manner, which not only improves convenience in use but also reduces the operational limitations caused by wired connection, such as a wireless mouse, a wireless keyboard, and a wireless network camera. Among these wireless electronic products, input tools (e.g. a wireless mouse and a wireless keyboard) are the most important products in the industry.

These input tools that can be wirelessly connected to a computer terminal, such as a wireless mouse, are usually equipped with a universal serial bus device having wireless connection and plug-and-play functions to be connected to a connection port of the computer terminal. As such, the wireless mouse can perform control operations on the computer terminal via wireless signal transmission between the wireless mouse and an antenna in the universal serial bus device. In practical application, a front end of the universal serial bus device usually has a button for a user to press, such that the universal serial bus device can be triggered to perform the aforesaid wireless pairing operation. However, since the button is movably disposed through an opening formed on a front cover of the universal serial bus device, it may cause electrostatic discharge to enter the universal serial bus device easily from the opening, so as to damage internal components (e.g., an antenna, a switch, etc.) of the universal serial bus device. As such, the anti-electrostatic discharge ability and service life of the universal serial bus device can be influenced greatly.

SUMMARY OF THE INVENTION

The present invention provides a universal serial bus device suitable for establishing wireless connection between a computer terminal and an external device. The universal serial bus device includes a base, a circuit board, an upper cover, a plurality of solder points, a switch, and a button mount. The circuit board is disposed on the base and has a front-end portion, a rear-end portion and a ground circuitry. The rear-end portion is for inserting into a connection port of the computer terminal. The upper cover covers the front-end portion and has an opening. The plurality of solder points is formed on an upper surface of the front-end portion and coupled to the ground circuitry. The switch has a metal cover. The switch is soldered to the plurality of solder points for controlling wireless connection between the computer terminal and the external device. The button mount is movably disposed through the opening and sleeves the front-end portion for triggering the switch. The button mount has a first guide hole formed corresponding to the switch. An electrostatic discharge entering from the opening passes through the first guide hole and is conducted to the ground circuitry via the metal cover and at least one of the plurality of solder points.

The present invention further provides a universal serial bus device suitable for establishing wireless connection between a computer terminal and an external device. The universal serial bus device includes a base, a circuit board, an upper cover, an antenna, and a button mount. The circuit board is disposed on the base and has a front-end portion, a rear-end portion and a ground circuitry. The rear-end portion is for inserting into a connection port of the computer terminal. The upper cover covers the front-end portion and has an opening. The antenna is mounted on an upper surface of the front-end portion. The button mount is movably disposed through the opening and sleeves the front-end portion for triggering a switch to control wireless connection between the computer terminal and the external device. The button mount has a covering structure formed corresponding to the antenna, and the covering structure is disposed around the antenna for preventing an electrostatic discharge from being conducted to the antenna via the opening.

The present invention further provides a universal serial bus device suitable for establishing wireless connection between a computer terminal and an external device. The universal serial bus device includes a base, a circuit board, an upper cover, a button mount, a rear conductive foil, a metal casing, and a conductive member. The circuit board is disposed on the base and has a front-end portion, a rear-end portion and a ground circuitry. The rear-end portion is for inserting into a connection port of the computer terminal. The upper cover covers the front-end portion and has an opening. The button mount is movably disposed through the opening and sleeves the front-end portion for triggering a switch for control wireless connection between the computer terminal and the external device. The rear conductive foil is formed on the upper surface. The rear conductive foil is adjacent to the rear-end portion and coupled to the ground circuitry. The metal casing is connected to the upper cover and sleeves the rear-end portion. The metal casing is bent downward to form a contact sheet corresponding to the rear conductive foil. The conductive member is disposed on the rear conductive foil and abutting against the contact sheet. An electrostatic discharge conducted to the ground circuitry is conducted to the computer terminal via the rear conductive foil, the conductive member and the metal casing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
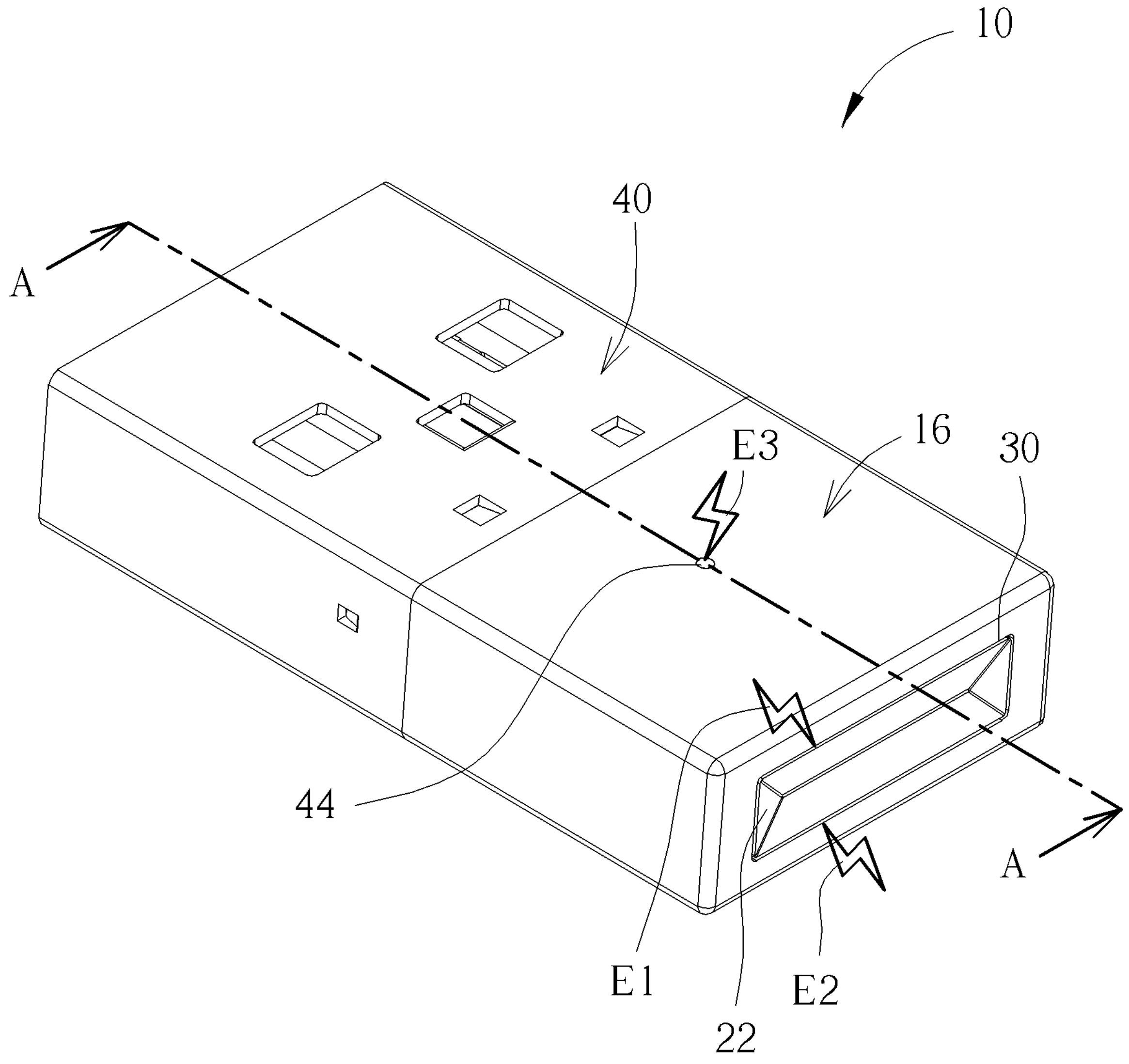
FIG. 1 is a diagram of a universal serial bus device according to an embodiment of the present invention.
Figure 2:
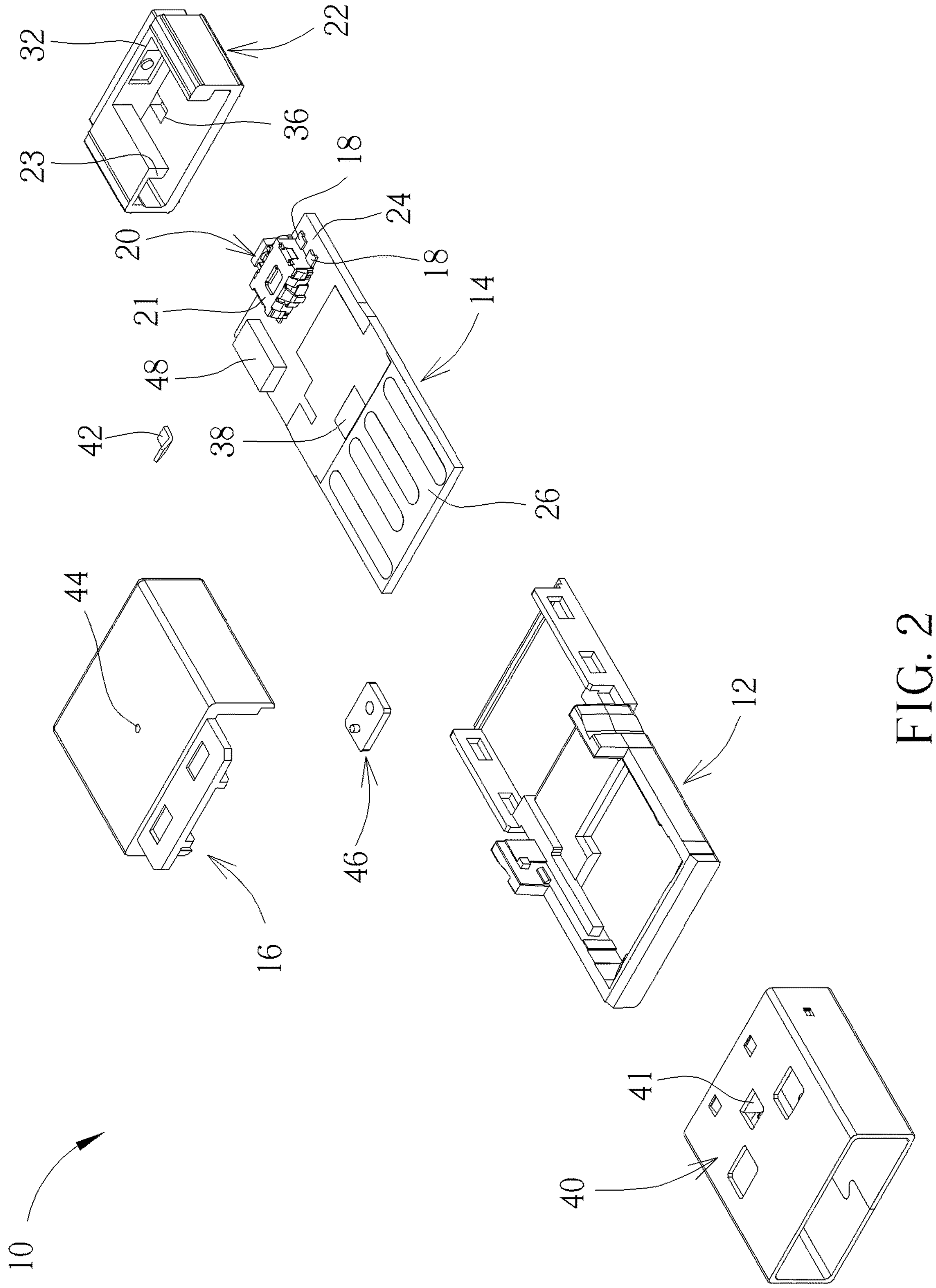
FIG. 2 is an exploded diagram of the universal serial bus device in FIG. 1.
Figure 3:
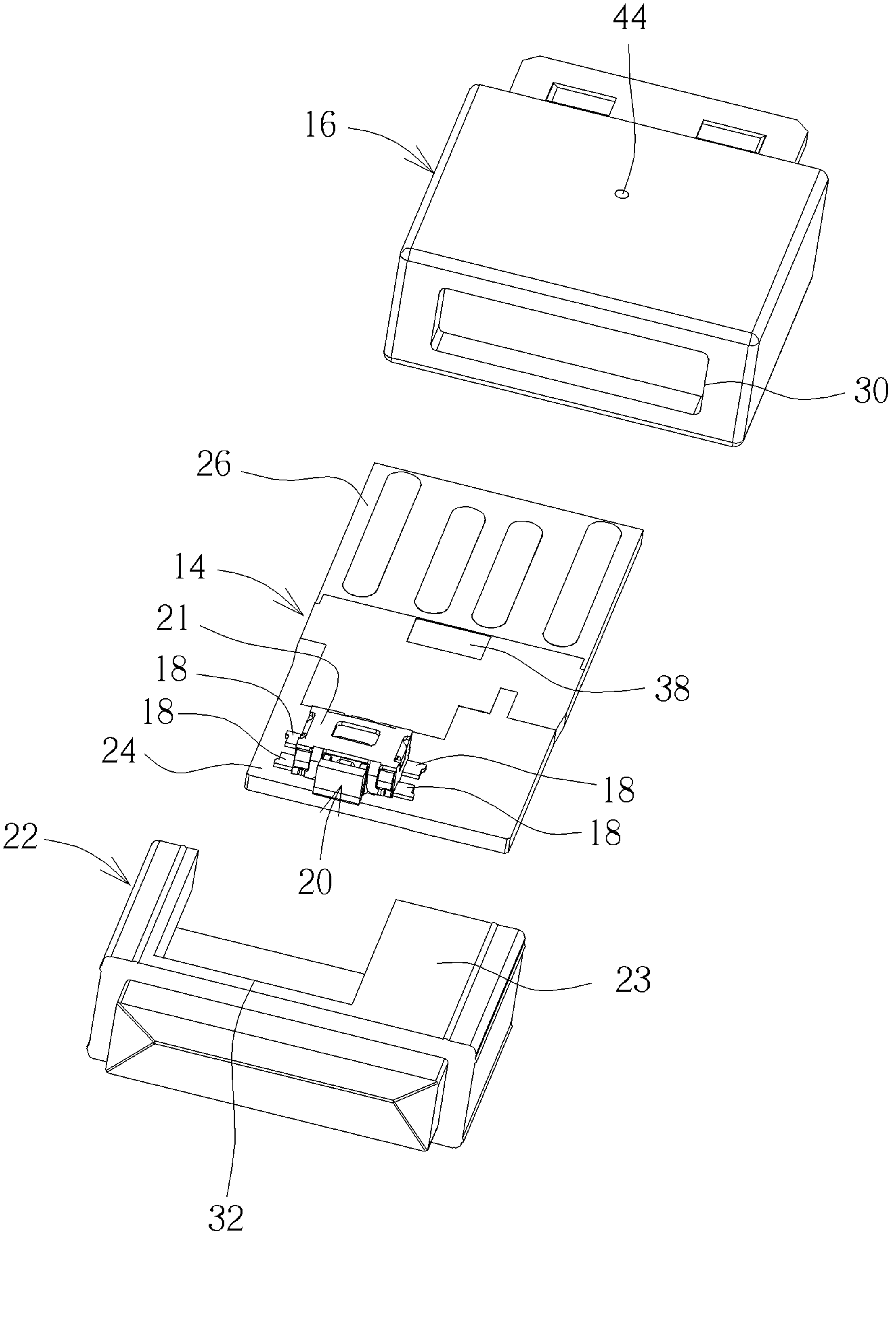
FIG. 3 is an exploded diagram of a circuit board, an upper cover, a switch, and a button mount in FIG. 1 from another viewing angle.
Figure 4:
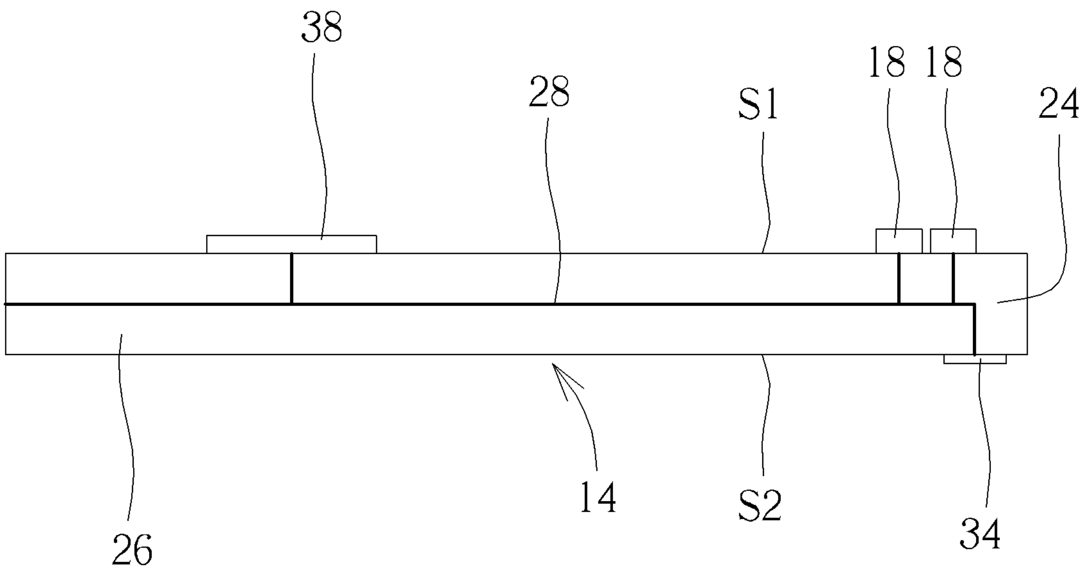
FIG. 4 is a side view of the circuit board in FIG. 1.

Please refer to FIG. 1, FIG. 2, FIG. 3, and FIG. 4. FIG. 1 is a diagram of a universal serial bus device 10 according to an embodiment of the present invention. FIG. 2 is an exploded diagram of the universal serial bus device 10 in FIG. 1. FIG. 3 is an exploded diagram of a circuit board 14, an upper cover 16, a switch 20, and a button mount 22 in FIG. 1 from another viewing angle. FIG. 4 is a side view of the circuit board 14 in FIG. 1. For clearly showing the component configuration of the circuit board 14, the circuit board 14 and the related components are depicted by simple blocks in FIG. 4. The universal serial bus device 10 could be preferably applied to establishing wireless connection between a computer terminal (e.g., a notebook or a desktop computer) and an external device (e.g., a wireless keyboard or a wireless mouse) for performing related control operations (e.g., inputting characters, moving a cursor, etc.) on the computer terminal via the external device. As shown in FIGS. 1-4, the universal serial bus device 10 includes a base 12, the circuit board 14, the upper cover 16, a plurality of solder points 18 (e.g., tin soldering, four as shown in FIG. 3, but not limited thereto), the switch 20, and the button mount 22. The circuit board 14 is disposed on the base 12 and has a front-end portion 24, a rear-end portion 26, and a ground circuitry 28. The rear-end portion 26 could preferably adopt an edge-board contact design as shown in FIG. 2 (but not limited thereto) for inserting into a connection port of the computer terminal. The related description for the inserting design of the universal serial bus device 10 is commonly seen in the prior art and omitted herein.

More detailed description for the anti-electrostatic discharge design of the universal serial bus device 10 is provided as follows. As shown in FIGS. 1-4, the upper cover 16 covers the front-end portion 24 and has an opening 30, and the plurality of solder points 18 is formed on an upper surface S1 of the front-end portion 24 and is coupled to the ground circuitry 28 of the circuit board 14. The switch 20 is used for controlling wireless connection between the computer terminal and the external device. The switch 20 has a metal cover 21 and is soldered to the plurality of solder points 18. The button mount 22 sleeves the front-end portion 24 and is movably disposed through the opening 30, such that a user can press the button mount 22 for triggering the switch 20. The button mount 22 has a first guide hole 32 formed corresponding to the switch 20 for establishing an electrostatic-discharge guide path in the upper cover 16. As for the related description for the grounding design of the circuit board 14, it is commonly seen in the prior art and omitted herein.

Via the aforesaid design, if an electrostatic discharge enters the universal serial bus device 10 from the opening 30 of the upper cover 16 (for example, an electrostatic discharge E1 as shown in FIG. 1 enters from an upper side of the opening 30), the electrostatic discharge E1 can be conducted to the ground circuitry 28 of the circuit board 14 smoothly along a shorter electrostatic-discharge guide path formed by the first guide hole 32, the metal cover 21 and at least one of the plurality of solder points 18. That is, the metal cover 21 grounded through the solder point 18 can generate a metal shielding effect on the switch 20. As a result, the universal serial bus device 10 can provide an anti-electrostatic discharge function. In such a manner, the present invention can efficiently solve the prior art problem that the electrostatic discharge enters the universal serial bus device easily from the opening to damage the internal components (e.g., an antenna, a switch, etc.) of the universal serial bus device. As such, the anti-electrostatic discharge ability and service life of the universal serial bus device can be improved greatly.

To be noted, for improving the anti-electrostatic discharge ability of a bottom of the universal serial bus device, the present invention could further adopt a bottom conductive foil design. For example, as shown in FIG. 2 and FIG. 4, the universal serial bus device 10 could further include a bottom conductive foil 34. The bottom conductive foil 34 could be formed on a lower surface S2 of the front-end portion 24 and is coupled to the ground circuitry 28, and the button mount 22 could have a second guide hole 36 formed corresponding to the bottom conductive foil 34 for establishing another electrostatic-discharge guide path in the upper cover 16. In such a manner, via the aforesaid design, if an electrostatic discharge E2 as shown in FIG. 1 enters from a lower side of the opening 30, the electrostatic discharge E2 can be conducted to the ground circuitry 28 of the circuit board 14 smoothly along a shorter electrostatic-discharge guide path formed by the second guide hole 36 and the bottom conductive foil 34. That is, the bottom conductive foil 34 can generate a metal shielding effect on the circuit board 14. As a result, the universal serial bus device 10 can provide an anti-electrostatic discharge function for the bottom of the universal serial bus device 10.

Figure 5:
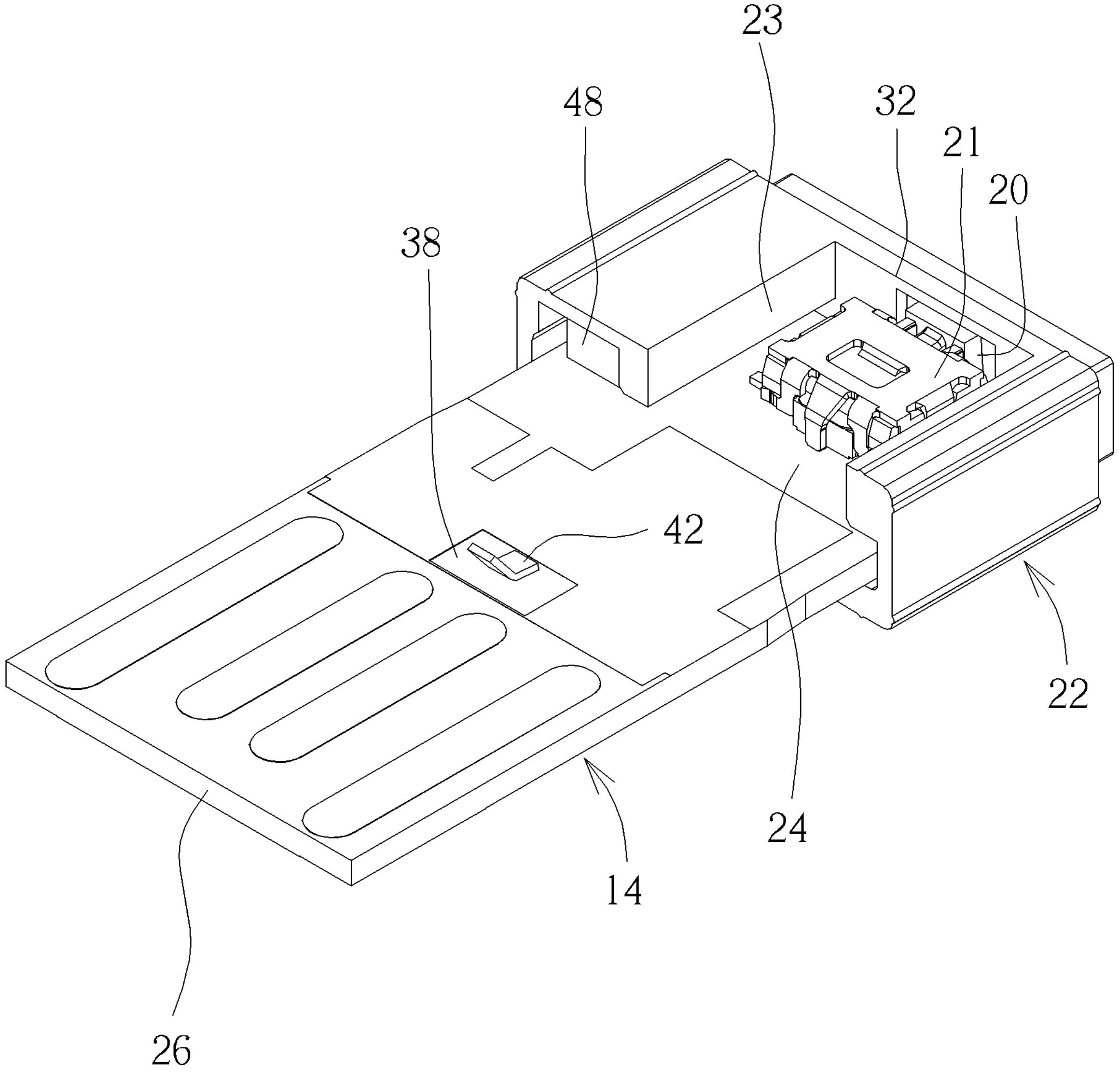
FIG. 5 is an internal assembly diagram of the universal serial bus device in FIG. 1.
Figure 6:
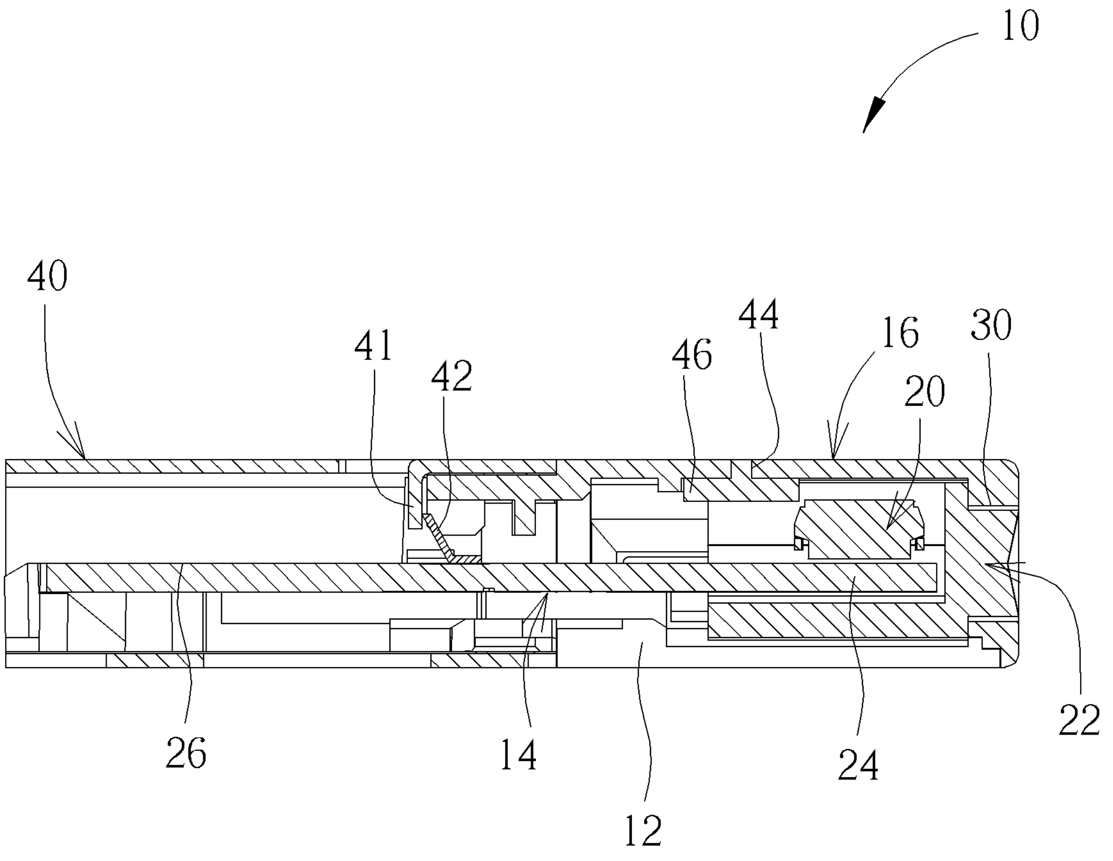
FIG. 6 is a cross-sectional diagram of the universal serial bus device in FIG. 1 along a cross-sectional line A-A.

In practical application, the present invention could adopt the anti-electrostatic discharge design that the circuit board is grounded to the computer terminal. For example, please refer to FIG. 2, FIG. 4, FIG. 5, and FIG. 6. FIG. 5 is an internal assembly diagram of the universal serial bus device 10 in FIG. 1. FIG. 6 is a cross-sectional diagram of the universal serial bus device 10 in FIG. 1 along a cross-sectional line A-A. As shown in FIG. 2, FIG. 4, FIG. 5, and FIG. 6, the universal serial bus device 10 could further include a metal casing 40, a conductive member 42, and a rear conductive foil 38 formed on the upper surface S1. The rear conductive foil 38 is adjacent to the rear-end portion 26 and is coupled to the ground circuitry 28. The metal casing 40 is connected to the upper cover 16 and sleeves the rear-end portion 26. The metal casing 40 is bent downward to form a contact sheet 41 corresponding to the rear conductive foil 38. The conductive member 42 could be preferably a bent sheet (but not limited thereto, meaning that the present invention could adopt other conductive design, such as disposing a conductive block to be sandwiched between the metal casing 40 and the rear conductive foil 38). The conductive member 42 is disposed on the rear conductive foil 38 (e.g., by soldering, but not limited thereto) and abuts against the contact sheet 41 (as shown in FIG. 6). Accordingly, the aforesaid electrostatic discharges conducted to the ground circuitry 28 (i.e., the electrostatic discharge E1 and the electrostatic discharge E2) can be conducted to the computer terminal along an electrostatic-discharge guide path formed by the rear conductive foil 38, the conductive member 42 and the metal casing 40. In such a manner, the present invention can further improve the anti-electrostatic discharge ability of the universal serial bus device.

Furthermore, even if there is an electrostatic discharge entering from a top of the universal serial bus device 10, the universal serial bus device 10 can still generate the anti-electrostatic discharge effect via the aforesaid design in which the switch 20 has the metal cover 21 and is soldered to the solder point 18 to be coupled to the ground circuitry 28. For example, as shown in FIG. 1 and FIG. 6, the upper cover 16 has a light-exit hole 44 formed adjacent to the metal cover 21, and the universal serial bus device 10 could further include an indicator light source 46. The indicator light source 46 (preferably alight emitting diode, but not limited thereto) is disposed on the upper cover 16 and corresponds to the light-exit hole 44. The indicator light source 46 is coupled to the circuit board 14 for emitting light out of the light-exit hole 44 for providing a light indicating function (such as indicating a wireless pairing status of the universal serial bus device 10). In such a manner, an electrostatic discharge E3 entering the universal serial bus device 10 through the light-exit hole 44 can be conducted to the ground circuitry 28 of the circuit board 14 smoothly along a shorter electrostatic-discharge guide path formed by the light-exit hole 44, the metal cover 21 and at least one of the plurality of solder points 18. As a result, the universal serial bus device 10 can provide an anti-electrostatic discharge function for the top of the universal serial bus device 10.

It should be mentioned that the present invention could adopt a covering structural design for preventing an electrostatic discharge from being conducted to an antenna on the front-end portion directly. For example, as shown in FIG. 4 and FIG. 5, the universal serial bus device 10 could further include an antenna 48. The antenna 48 could be mounted on the upper surface S1 of the front-end portion 24 for providing a wireless signal transmission function, and the button mount 22 could have a covering structure 23 formed corresponding to the antenna 48. The covering structure 23 is disposed around the antenna 48. Since the electrostatic discharge entering the universal serial bus device 10 from the opening 30 must bypass the covering structure 23 to reach the antenna 48, the covering structure 23 can generate the anti-electrostatic discharge effect, so as to surely prevent the electrostatic discharge from being conducted to the antenna 48 directly.

The solder point grounding design, the rear conductive foil design, and the antenna covering design mentioned in the aforesaid embodiments can be implemented independently or mutually applied to each other, so as to improve the design flexibility of the universal serial bus device of the present invention in electrostatic discharge protection. For example, in the embodiment that the solder point grounding design and the rear conductive foil design are omitted, the universal serial bus device of the present invention could only adopt the antenna covering design to prevent the electrostatic discharge from being conducted to the antenna directly. As for other derived embodiments (e.g., the embodiment that the solder point grounding design or the rear conductive foil design is implemented independently and the embodiment that only the solder point grounding design and the antenna covering design are adopted), the related description could be reasoned by analogy and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A universal serial bus device suitable for establishing wireless connection between a computer terminal and an external device, the universal serial bus device comprising:

a base;

a circuit board disposed on the base and having a front-end portion, a rear-end portion and a ground circuitry, the rear-end portion being for inserting into a connection port of the computer terminal;

an upper cover covering the front-end portion and having an opening;

a plurality of solder points formed on an upper surface of the front-end portion and coupled to the ground circuitry;

a switch having a metal cover, the switch being soldered to the plurality of solder points for controlling wireless connection between the computer terminal and the external device; and a button mount movably disposed through the opening and sleeving the front-end portion for triggering the switch, the button mount having a first guide hole formed corresponding to the switch;

wherein an electrostatic discharge entering from the opening passes through the first guide hole and is conducted to the ground circuitry via the metal cover and at least one of the plurality of solder points.

2. The universal serial bus device of claim 1 further comprising:

a bottom conductive foil formed on a lower surface of the front-end portion and coupled to the ground circuitry, the button mount having a second guide hole formed corresponding to the bottom conductive foil;

wherein the electrostatic discharge entering from the opening passes through the second guide hole and is conducted to the ground circuitry via the bottom conductive foil.

3. The universal serial bus device of claim 1 further comprising:

a rear conductive foil formed on the upper surface, the rear conductive foil being adjacent to the rear-end portion and coupled to the ground circuitry;

a metal casing connected to the upper cover and sleeving the rear-end portion, the metal casing being bent downward to form a contact sheet corresponding to the rear conductive foil; and a conductive member disposed on the rear conductive foil and abutting against the contact sheet;

wherein the electrostatic discharge conducted to the ground circuitry is conducted to the computer terminal via the rear conductive foil, the conductive member and the metal casing.

4. The universal serial bus device of claim 1, wherein the upper cover has a light-exit hole adjacent to the metal cover, the universal serial bus device comprising:

an indicator light source disposed on the upper cover and coupled to the circuit board for emitting light out of the light-exit hole.

5. A universal serial bus device suitable for establishing wireless connection between a computer terminal and an external device, the universal serial bus device comprising:

a base;

a circuit board disposed on the base and having a front-end portion, a rear-end portion and a ground circuitry, the rear-end portion being for inserting into a connection port of the computer terminal;

an upper cover covering the front-end portion and having an opening;

an antenna mounted on an upper surface of the front-end portion; and a button mount movably disposed through the opening and sleeving the front-end portion for triggering a switch to control wireless connection between the computer terminal and the external device;

wherein the button mount has a covering structure formed corresponding to the antenna, and the covering structure is disposed around the antenna for preventing an electrostatic discharge from being conducted to the antenna via the opening.

6. The universal serial bus device of claim 5 further comprising:

a bottom conductive foil formed on a lower surface of the front-end portion and coupled to the ground circuitry, the button mount having a guide hole formed corresponding to the bottom conductive foil;

wherein the electrostatic discharge entering from the opening passes through the guide hole and is conducted to the ground circuitry via the bottom conductive foil.

7. The universal serial bus device of claim 5 further comprising:

a rear conductive foil formed on the upper surface, the rear conductive foil being adjacent to the rear-end portion and coupled to the ground circuitry;

a metal casing connected to the upper cover and sleeving the rear-end portion, the metal casing being bent downward to form a contact sheet corresponding to the rear conductive foil; and a conductive member disposed on the rear conductive foil and abutting against the contact sheet;

wherein the electrostatic discharge conducted to the ground circuitry is conducted to the computer terminal via the rear conductive foil, the conductive member and the metal casing.

8. A universal serial bus device suitable for establishing wireless connection between a computer terminal and an external device, the universal serial bus device comprising:

a base;

a circuit board disposed on the base and having a front-end portion, a rear-end portion and a ground circuitry, the rear-end portion being for inserting into a connection port of the computer terminal;

an upper cover covering the front-end portion and having an opening;

a button mount movably disposed through the opening and sleeving the front-end portion for triggering a switch for control wireless connection between the computer terminal and the external device;

a rear conductive foil formed on the upper surface, the rear conductive foil being adjacent to the rear-end portion and coupled to the ground circuitry;

a metal casing connected to the upper cover and sleeving the rear-end portion, the metal casing being bent downward to form a contact sheet corresponding to the rear conductive foil; and a conductive member disposed on the rear conductive foil and abutting against the contact sheet;

wherein an electrostatic discharge conducted to the ground circuitry is conducted to the computer terminal via the rear conductive foil, the conductive member and the metal casing.

9. The universal serial bus device of claim 8 further comprising:

a bottom conductive foil formed on a lower surface of the front-end portion and coupled to the ground circuitry, the button mount having a guide hole formed corresponding to the bottom conductive foil;

wherein the electrostatic discharge entering from the opening passes through the guide hole and is conducted to the ground circuitry via the bottom conductive foil.

10. The universal serial bus device of claim 8, wherein the conductive member is a conductive block or a bent sheet.

11. The universal serial bus device of claim 10, wherein the conductive block is sandwiched between the metal casing and the rear conductive foil.

12. The universal serial bus device of claim 10, wherein the bent sheet is soldered to the rear conductive foil.

* * * * *